No. 694,903. Patented Mar. 4, 1902.
J. P. WYNN.
DEVICE FOR EMPTYING CLAY PANS.
(Application filed June 19, 1901.)
(No Model.)
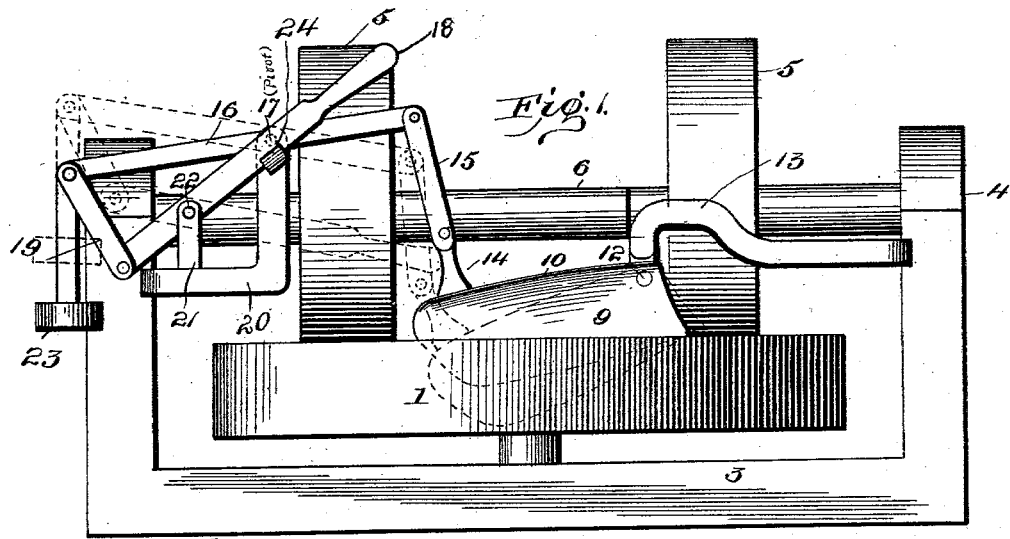
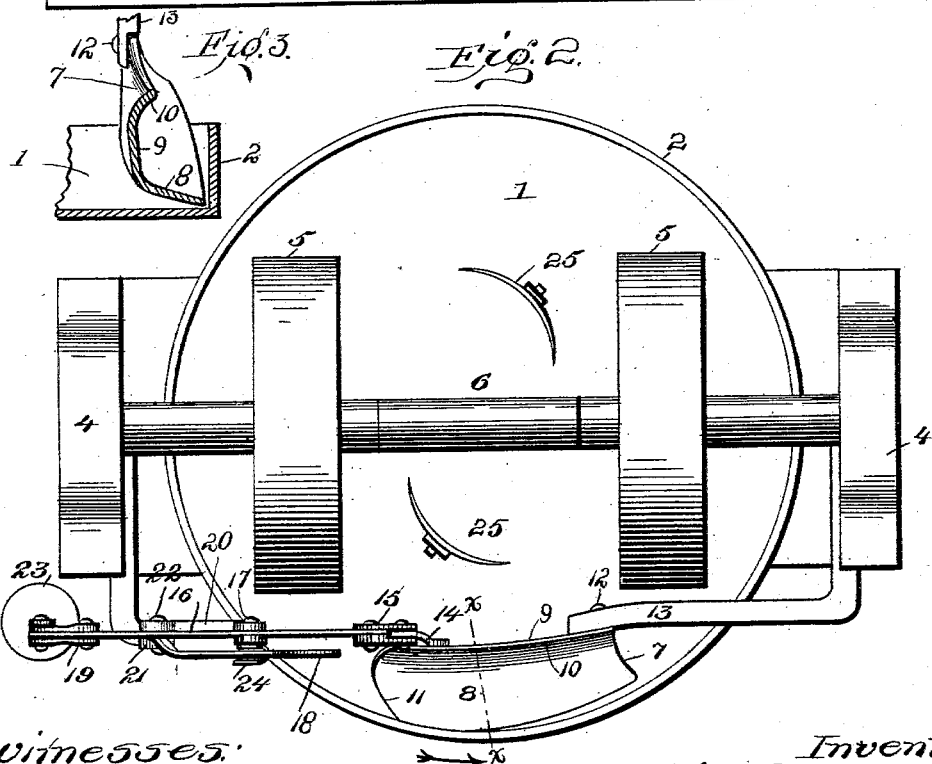

UNITED STATES PATENT OFFICE.

JOHN P. WYNN, OF BEECHCREEK, PENNSYLVANIA, ASSIGNOR OF ONE-HALF TO JAMES A. BICKFORD AND THOMAS M. STEVENSON, OF LOCKHAVEN, PENNSYLVANIA.

DEVICE FOR EMPTYING CLAY-PANS.

SPECIFICATION forming part of Letters Patent No. 694,903, dated March 4, 1902.

Application filed June 19, 1901. Serial No. 65,153. (No model.)

*To all whom it may concern:*

Be it known that I, JOHN P. WYNN, a citizen of the United States, residing at Beechcreek, in the county of Clinton and State of Pennsylvania, have invented certain new and useful Improvements in Devices for Instantaneously Emptying Clay-Pans; and I do declare that the following is a full, clear, and exact description of the invention, which will enable others skilled in the art to which it appertains to make and use the same.

The object of my invention is to devise means for expeditiously emptying clay-pans. This I accomplish by means of a novel plan of shovel pivoted in a novel manner to a portion of the pan-frame. This shovel may be caused to engage with the mass of clay in the pan, and by the circular motion of the latter the clay will be forced up the inclined face of the shovel and over the rim of the pan.

The present invention is particularly designed as an improvement upon the device described and illustrated in Letters Patent of the United States No. 425,729, issued April 18, 1890, to Arthur A. Bennett. In the above-mentioned patent a very crude form of moldboard is shown, which will not lift the clay entirely over the edge of the pan, as will my improved shovel. Furthermore, the actuating mechanism for the moldboard is inefficient, as will be described hereinafter.

My invention also has particular reference to the configuration of the shovel itself, by means of which the clay will be quickly and readily ejected in the form of a continuous or nearly-continuous ribbon above and clear of the edge of the pan.

My invention also has relation to a novel means for mounting the shovel so that it may be easily engaged with the mass of clay within the rapidly-revolving pan and will automatically remain in position, lifting the clay from the pan over the edge thereof. This I accomplish by pivoting the shovel at a point in advance of the engaging edge of the shovel, so that the clay in contact with said edge will be forced up the inclined surface of the shovel and will tend to force it downward and will keep it constantly in engagement with the bottom of the pan.

In order to better understand the nature of my invention, attention is called to the accompanying drawings, forming a part of this specification, and in which—

Figure 1 is a front view of a pan, showing by full lines the position the shovel will assume when it is elevated and in broken lines when it is depressed. Fig. 2 is a top view thereof, and Fig. 3 is a section taken on the lines x x of Fig. 2 looking in the direction indicated by the arrow and showing the shovel in the depressed position.

In the several views like parts are designated by the same figures of reference.

The pan 1, with a rim 2, mounted on a foundation 3, with side standards 4 4, rolls 5 5, and shaft 6, is of any well-known design and forms in itself no part of the present invention. The shovel 7 is of a peculiar configuration. It has a slightly-concave bottom 8 with a slightly-concave back 9. The latter is capped by an outturning rolling edge 10. The leading edge 11 is cut at an acute angle with the back 9, as is shown. The shape of the shovel is such that upon its being lowered in a loaded and revolving pan to the position shown by broken lines in Fig. 1 the leading edge 11 will engage with the mass of clay, which will be forced up the trough formed by the bottom 8 and back 9 in the form of a continuous ribbon. The rolling edge 10 will turn the outpassing ribbon over clear of the upper edge of the rim 2.

The actuating mechanism for the shovel is as follows: The shovel is pivoted at 12 to a fixed arm 13 or to any other suitable point. An offset 14 on the shovel connects, by means of a link 15, to a horizontal lever 16. The latter is fulcrumed at 17 to an offset or arm 20. A hand-lever 18, pivoted at 22 on a short standard 21, connects, through the agency of a short link 19, to one extremity of the lever 16. A counterweight 23, sufficiently heavy to keep the parts in the position illustrated by full lines in Figure 1, is attached to the outer extremity of the lever 16. A notch 24, with which the hand-lever engages, prevents any possible accidental displacement of the latter. Two or more guides or baffle-plates 25 25, attached in the usual manner to the pan-frame, are provided for directing the clay to a position to be acted upon by the rolls 5 5 or to the periphery of the pan when the shovel is to be brought into use.

The operation of the device is as follows: The pan revolves in the direction of the arrow shown in Fig. 2. The clay having been acted upon by the rolls until it is in the desired consistency and is ready for removal, the guide-plates 25 25 are so arranged as to direct the clay toward the periphery of the pan. The shovel is depressed to the position shown in broken lines in Fig. 1 by first disengaging the hand-lever 18 from its engagement with the notch 24 and depressing it. This operation through the agency of the link 19, lever 16, and link 15 will lower the shovel. The leading edge 11 will engage with the mass of clay, which will be forced up the inclined bottom 8 and turned over above and clear of the edge of the pan in the form of a continuous or nearly-continuous ribbon. It will be seen that the leading edge 11 may be easily engaged with the moving mass of clay. Having been lowered, the action of the clay on the shovel will automatically keep it in position.

It will be seen that my device is much more practicable than that illustrated and described in Letters Patent No. 425,729 in that in my device the shape of the shovel is such as to cleanly lift the mass of clay over and clear of the pan edge, while the moldboard illustrated in the above-mentioned Letters Patent will simply force a shapeless mass of clay upon and against the edge of the pan. Furthermore, by pivoting the shovel in advance of its leading edge it may be readily engaged with the clay and will be held in a depressed position by the clay being forced upon it, while in the above-mentioned Letters Patent the moldboard must be bodily forced into the moving mass of clay and must be positively retained in position, the action of emptying in no way tending to retain the parts in place.

Having now described and ascertained the nature of my said invention, what I claim, and desire to secure by Letters Patent, is—

1. In a device for emptying pans, the combination with the pan of a shovel having a substantially vertical, slightly concave back set at an acute angle to the pan-rim, the shovel being pivoted within the pan in advance of its leading edge, and means for moving the shovel upon its pivot, the parts being so proportioned and arranged that upon the shovel being lowered, its leading edge will engage with the moving mass of clay, which will be forced up the trough formed by the bottom and back of the shovel in the form of a continuous ribbon clear of the edge of the pan.

2. In a device for emptying pans, the combination with the pan of a shovel having a substantially vertical, slightly concave back set at an acute angle to the pan-rim, an outturning, rolling top edge for the back, the shovel being pivoted within the pan in advance of its leading edge, and means for moving the shovel upon its pivot, the parts being so proportioned and arranged that upon the shovel being lowered, its leading edge will engage with the moving mass of clay, which will be forced up the trough formed by the bottom and back of the shovel in the form of a continuous ribbon clear of the edge of the pan.

This specification signed and witnessed this 17th day of June, 1901.

JOHN P. WYNN.

Witnesses:
J. A. BICKFORD,
J. MILES YOST.